June 13, 1961 E. J. MILLS, JR., ET AL 2,988,572
PROCESS FOR THE MANUFACTURE OF POLYOXYALKYLENE COMPOUNDS
Filed March 7, 1958
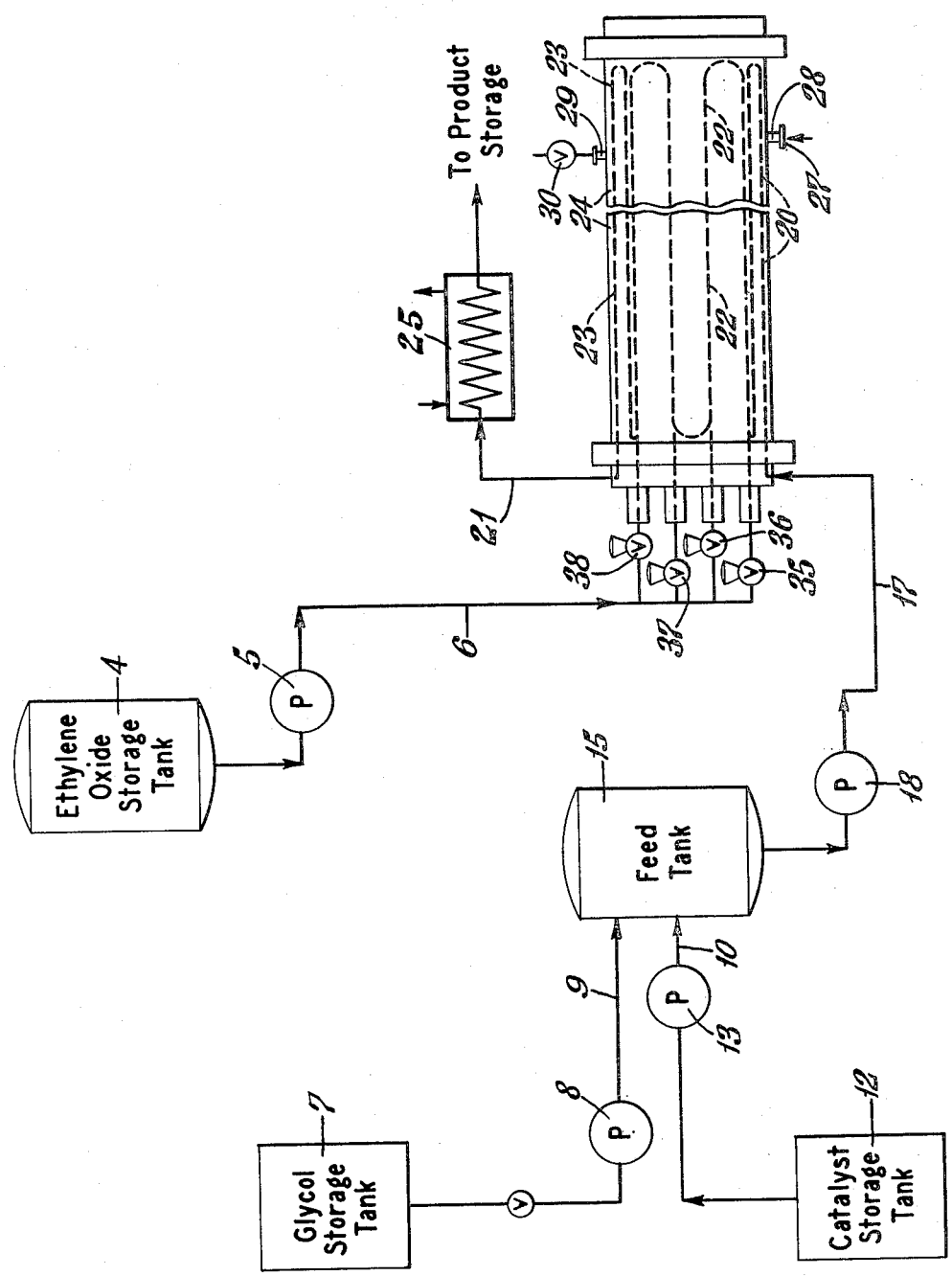
INVENTORS
EDWARD J. MILLS, JR.
DONALD G. LEIS
BY *William E. O'Brien*
ATTORNEY

United States Patent Office 2,988,572
Patented June 13, 1961

2,988,572
PROCESS FOR THE MANUFACTURE OF POLY-
OXYALKYLENE COMPOUNDS
Edward J. Mills, Jr., Charleston, and Donald G. Leis,
St. Albans, W. Va., assignors to Union Carbide Corporation, a corporation of New York
Filed Mar. 7, 1958, Ser. No. 719,784
5 Claims. (Cl. 260—615)

This invention relates to polyoxyalkylene compounds, and more particularly to the preparation of polyoxyalkylene compounds by a continuous method of operation.

Polyoxyalkylene compounds are well known commercial materials which find wide application in many industries. As an example, polyoxyethylene glycol is important as a source material in the manufacture of polyoxyethylene stearate esters, materials which are used as emulsifiers in the food, drug, and cosmetic industries. In general, the polyoxyethylene glycols are prepared commercially by a batchwise operation in steel reactors equipped with circulating pumps and external heat exchangers. To a starting material such as water, ethylene glycol, or diethylene glycol, which contains a strong alkaline catalyst, ethylene oxide is charged to the reaction vessel at a rate sufficient to maintain a pressure of 60 pounds per square inch gauge while the temperature is maintained at 120 to 135° C. Since the reaction is exothermic, cooling water is circulated through the heat exchanger to provide the desired temperature. After all the ethylene oxide has been added, which may take from three to fifteen hours depending upon the molecular weight of the product, the system is maintained at a constant temperature so as to soak or consume residual ethylene oxide. The reaction products are neutralized, filtered and sent to storage.

The above-type reaction products are believed to be complex mixtures of glycol molecules of various molecular weights, depending on the length of the polyoxyethylene chain, which is built up by the addition of the oxyethylene group, —$OC_2H_4$—, to the individual molecules. As far as is known, the polyoxyethylene glycol addition products have not been resolved into identifiable constituents, except possibly in the case of readily distillable products of low molecular weight. Depending upon the molecular weight, the melting or softening temperatures of these products are given as ranging from about —50° C. to +10° C., for an average molecular weight of about 200–300, up to about 60° to 65° C. for an average molecular weight of about 3,000–4,000. At normal room temperatures, the polyoxyethylene glycols of an average molecular weight of about 800 to 900 have the consistency of a semi-fluid, pasty mass. Below this range of molecular weight the products are clear, colorless, normally-liquid compositions. The polyoxyethylene glycols are miscible with water in all proportions. At and above an average molecular weight of about 900–1000, the polyoxyethylene glycols are low-melting, normally-solid mixtures having fusion temperatures which increase with molecular weight from about 30° C. to a maximum of 60° to 65° C.

To a large extent, commercial preparation of polyoxyalkylene compounds, particularly the polyoxyethylene glycols, by a batch process has been handicapped inasmuch as the physical characteristics of such compounds vary from batch to batch resulting, in turn, in products of inferior quality which fail to meet accepted standards of color, taste and odor. Additionally, the conventional batchwise preparation of polyoxyethylene glycols in steel tanks fitted with circulating pumps and external heat exchangers, etc., presents the serious difficulty of maintaining the pressure and feed rate of the ethylene oxide at a constant value throughout the reaction. A further problem encountered in the batch type operation is that the average molecular weights of glycol addition products of the kind referred to above, as determined by the ebullioscopic method or calculated from viscosity measurements or acetyl values, are often lower than those calculated from the amount of ethylene oxide entering into the reaction. The difference may be accounted for by a number of factors including high concentrations of free ethylene oxide which favor isomerization, side reactions arising out of the presence of aldehydes and other impurities in the reactants, and the formation of oxyethylene compounds of low molecular weight during the course of the addition reaction.

It is an object of the present invention, therefore, to provide for the preparation of high quality polyoxyalkylene compounds as judged by color, taste and odor. A further object of the invention is to provide a continuous process for the preparation of polyoxyalkylene compounds, particularly the polyoxyethylene glycols, by reaction of an alkylene oxide with a polyhydric alcohol. It is a further object of the invention to provide a means whereby the feed rate of an alkylene oxide in reaction with a polyhydric alcohol can be maintained at a more nearly constant value throughout the reaction.

The term "polyoxyalkylene compound" as used herein refers to those compounds which may be prepared by the method of this invention by reaction of 1,2-alkylene oxide with either water or an aliphatic mono-, di-, tri-, or polyhydric alcohol, in the presence of an alkaline catalyst. In addition, the described compounds are characterized by recurring oxyalkylene groups of the type corresponding to the formula:

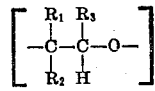

wherein $R_1$, $R_2$ and $R_3$ represent hydrogen or lower alkyl radicals. Of particular concern are the polyoxyalkylene compounds prepared by the reaction of at least one 1,2-alkylene oxide, such as ethylene oxide, 1,2-propylene oxide, 1,2-butylene oxide, and 2,3-butylene oxide, etc., with either water, an alkyl monohydroxy alcohol, an alkylene glycol, such as ethylene glycol or propylene glycol, etc., or an etheric di-, or tri-alkylene glycol, such as diethylene glycol ($HO[C_2H_4]O[C_2H_4]OH$), dipropylene glycol ($HO[C_3H_6]O[C_3H_6]OH$)
or triethylene glycol ($HO[C_2H_4]O[C_2H_4]O[C_2H_4]OH$), etc. Typical polyoxyalkylene compounds which may be prepared in accordance with the process of this invention are the polyoxyalkylene glycols, e.g., polyoxyethylene glycols, prepared by the addition of ethylene oxide to water, ethylene glycol, or diethylene glycol; polyoxypropylene glycols, prepared by the addition of 1,2-propylene oxide to either water, propylene glycol, or dipropylene glycol; and mixed oxyethylene-oxypropylene polyglycols, prepared in a similar manner, utilizing, however, a mixture of ethylene oxide and propylene oxide or sequential addition of ethylene oxide and 1,2-propylene oxide. Also typical of the polyoxyalkylene compounds are polyoxyalkylene glycol monoalkyl ethers of this type described in U.S. 2,213,477, 2,448,664, 2,425,755, and 2,677,700, prepared by reacting a 1,2-alkylene oxide such as ethylene oxide or 1,2-propylene oxide, mixtures thereof, or ethylene oxide and 1,2-propylene oxide sequentially, with an alkyl monohydroxy alcohol.

The above and other apparent objects for the preparation of polyoxyalkylene compounds in accordance with this invention are accomplished by the method which comprises introducing a catalyst-containing hydroxyl compound selected from the group consisting of water and aliphatic mono-, di-, tri-, and polyhydric alcohols into an elongated reaction chamber immersed in a heat transfer medium, and introducing a 1,2-alkylene oxide, or mixtures thereof, at a plurality of feed points at spaced intervals along the reaction chamber. The reaction chamber comprises an elongated, coil-type tubular reactor which is disposed within a shell member through which cooling fluids or gases are circulated. The hydroxyl compound together with a suitable alkaline catalyst is continuously passed through the elongated reaction chamber while the alkylene oxide reactant is introduced at a plurality of feed points at spaced intervals along the reaction chamber. Beyond the last addition point of alkylene oxide to the elongated reaction chamber is a soaking zone which serves to reduce the residual content of alkylene oxide in the reaction product to a predetermined minimum. The polyoxyalkylene reaction product is then cooled, neutralized, filtered, and recovered in a conventional manner.

The design of the apparatus and the plurality of feed points is based on the principle of controlled concentration of the alkylene oxide during reaction with the hydroxyl compound so as to obtain a high quality polyoxyalkylene product. In this manner high concentrations of free alkylene oxide which are known to favor the increased formation of aldehydes by isomerization are avoided and the presence of aldehydes and other contaminating materials which promote the development of color is substantially reduced. The concentration of alkylene oxide in the reactor as controlled by the plurality of feed points further provides a means whereby vaporization or hot spots can be minimized without resort to excessively high pressures. In particular, as compared to conventional batch preparations of polyoxyethylene glycols, the continuous process of this invention provides a more uniform product having less variation in molecular weight during manufacture and a superior quality polyoxyalkylene product as judged by color, taste, and odor.

Referring now more particularly to the drawing, which illustrates a preferred form of the apparatus as applied to the preparation of polyoxyethylene glycols, a 50 percent solution of caustic soda is pumped from storage tank 12 by means of pump 13 through line 10 into feed tank 15. The catalyst is then dispersed in feed tank 15 with the ethylene glycol starting material which is similarly introduced into the feed tank via line 9, pump 8 and storage tank 7. Dispersion of the catalyst and glycol starting material in feed tank 15 is accomplished by any suitable means as, for example, by a motor driven agitator. The glycol-catalyst solution, preferably after being filtered, enters the initial portion of the elongated reaction chamber 20 by means of pump 18 and line 17. In the particular embodiment shown, the annular reactor or reaction chamber 20, 22, 23, comprises 264 ⅝ inch O.D. tubes 20—22 and 58 one-inch O.D. tubes 23, all eighteen feet long, connected by U loops so that the tubes are in series forming, in effect, a single ⅝ inch tube about 4,750 feet long followed by a single one-inch tube about 1,044 feet long. The first section of ⅝ inch tube constitutes a preheating zone 20, the remaining ⅝ inch tube constitutes the reaction zone 22, and the one-inch tube comprises a soaking zone 23. The entire length of tubing is maintained in a constant level of hot water by means of liquid level controller 27 which admits the desired amount of water into the shell member via line 28.

The temperature within the reaction chamber is maintained between about 120 and 180° C., preferably between 120 and 140° C., by adjusting a pressure control regulator (not shown) to operate valve 30 in line 29 at the required pressure to maintain temperature.

After the glycol-catalyst solution enters preheat chamber 20 and flows for preheating through several passes of the reactor to a temperature between 30 to 100° C., and preferably about 50 to 70° C., ethylene oxide under pressure from storage tank 4 is introduced by means of pump 5 and line 6 to reaction chamber 22 through a plurality of feed points illustrated by lines 35, 36, 37 and 38 adjacent the cover on one end of the shell member 24. To facilitate introduction of ethylene oxide and the glycol-catalyst solution into the reactor, a liquid surge-control system can be employed to provide essentially uniform flow of reactants at a constant feed rate. This may be effected by the use of surge pots (not shown) in lines 10, 17, and 6 so as to remove the pulsation in the flow of liquid into the reactor. The first feed point 35 of ethylene oxide joins the preheated glycol-catalyst solution and the mixture is circulated through several passes, during which time the bulk of the reaction occurs and the exothermic heat of reaction is removed by the water. In the next several passes the concentration of alkylene oxide is reduced to a low value and the mixture is joined by the second ethylene oxide feed stream 36 and this mixture is allowed to react. Each subsequent addition of ethylene oxide at feed points 37 and 38, etc., is carried out in the same manner until a product of desired molecular weight is obtained. Beyond the last addition point, the reaction chamber comprises a soaking zone 23 where the residual amount of ethylene oxide in the reaction product is reduced to a desired amount usually not less than 0.1–0.4 percent with not less than 0.2 preferred. The polyoxyethylene glycol product is removed through line 21 and passes through a water-cooled coil type cooler 25 to lower the temperature for neutralization and subsequent treatment.

The total feed rate of the reactants ranges from 1,000 to 2,000 pounds per hour, and is preferably about 1,200 to 1,600 pounds per hour. The pressure on the system is about 400 to 550 p.s.i.g. although pressures as high as 600 p.s.i.g. may be used. The pressure drop on the reaction system ranges from about 200 to 400 pounds per square inch gauge and is preferably about 200 to 225 pounds per square inch gauge.

The amount of ethylene oxide introduced into the reaction chamber is determined by the average molecular weight of the product desired. The maximum amount of ethylene oxide introduced at any one given feed point, however, must be less than that value or concentration which would otherwise allow vaporization of the ethylene oxide in the coil-reactor at the reaction temperature. In the system described herein good results have been obtained by controlling the ethylene oxide addition so as to provide approximately the same concentration of unreacted ethylene oxide at each feed point. This amount may vary within a range between about 1 to 7 weight percent, based on the total weight of the reactants, and is preferably about 7 weight percent. The number of feed points for the introduction of ethylene oxide will depend upon the average molecular weight of the product desired and also the amount of ethylene oxide introduced at each feed point. The total number of feed points may range from a minimum of four up to as many as thirty or more feed points. For the most part the maximum number of feed points is limited by the practical considerations involved for obtaining a satisfactory product. For the polyoxyethylene glycols prepared herein which have a molecular weight of about 400, a total of twenty feed points for ethylene oxide was employed.

In determining the location of ethylene oxide feed points along the reaction chamber several factors are involved. As above mentioned, the ethylene oxide addition is controlled to give the same concentration of unreacted alkylene oxide about 7 weight percent, at each feed point. This concentration, however, is not permitted to dwindle to less than 0.1 percent by weight, and preferably not less than 1 percent, before the next addition point of ethylene oxide. Consequently as polymerization progresses and flow increases, the reaction rate decreases and it is therefore necessary that the time and the distance between ethylene oxide feed points be increased. Once a given range of feed rates is established and a maximum concentration of ethylene oxide is selected, the latter concentration being below that value which would allow vaporization of ethylene oxide in the reactor, the length of the reactor and the distance between feed points are fixed by virtue of the known reaction rate of ethylene oxide with the ethylene glycol or other polyhydric alcohols. Thus, when ethylene oxide is added to make a concentration of 7 percent, the time required for this to react to a concentration of about one percent can be calculated. During this period the reactant stream moves through a length of tubing which can be calculated from the known feed rate. This length of tubing then becomes the distance between feed points and therefore the number of passes in the coil-reactor between the ethylene oxide feed points.

For the polyoxyalkylene compounds prepared herein a total of twenty feed points was employed along a ⅝ inch tubing having an inside diameter of 0.495 inch. While the diameter of the tubing used as the reactor is not critical, the diameter chosen must be such as will provide turbulent flow in the reactor over the range of feed rates chosen. The flow and reactor diameter should be such that the Reynolds number is not less than about 3,000. For calculating the length of reactor tubing required between feed points the following equation may be employed.

$$K_1 = \frac{2.303}{t} \log \frac{C_1}{C_2}$$

where $K_1$ = specific reaction rate constant
$t$ = time in seconds
$C_1$ = initial mole fraction of alkylene oxide
$C_2$ = final mole fraction of alkylene oxide Applying the equation to the preparation of a polyoxyethylene glycol having an average molecular weight of 400 (assuming a production rate of 1,200 lb./hr.; an inside reactor diameter of 0.495 inch; and a total of twenty ethylene oxide feed points) and calculating the time required for the flow of reactants between the nineteenth and twentieth feed points, the equation becomes:

$$t = \frac{2.303}{K_1} \log \frac{C_1}{C_2}$$

$$t = \frac{2.303}{0.02} \log \frac{0.35}{0.078}$$

$t = 75.3$ seconds or 1.26 minutes and the volume of reactor tubing required for 1.26 minutes of flow is 595 in.³. The length L of the reactor then becomes:

$$V = L\pi R^2$$

$$595 = L(3.1416)\left(\frac{0.495}{2}\right)^2$$

$L = 3080$ inches $L = 257$ feet

Since the reaction chamber comprises a series of tubes eighteen feet long connected by U loops, there are 14.3 passes between the nineteenth and twentieth feed points. In actual operation, however, the ethylene oxide feed points are not located along the length of the reactor tubing, but are disposed adjacent the end of the reactor at the nearest even number of passes. Hence in the above illustration there are sixteen passes between the nineteenth and twentieth feed points.

As previously mentioned, beyond the last ethylene oxide addition point the reaction chamber serves as a conventional soaking zone in which trace amounts of ethylene oxide are consumed. The concentration of residual ethylene oxide is usually reduced to a concentration of about 0.05 to 1.0 percent, based on the total weight of the product, and preferably to a concentration of about 0.2 to 0.4 percent. The volume of tubing required for the reduction of ethylene oxide in the soaking zone may be calculated from the equation described above and is usually about one to two times the volume required for a reactor section.

In preparing the polyoxyalkylene compounds by the method of this invention, any of the known catalysts for this type of addition reaction may be employed. The preferred catalysts are sodium hydroxide or potassium hydroxide in an amount ranging from 0.02 to 1.0 percent by weight, based on the total amount of reactants, including the alkylene oxide or mixtures thereof appearing in the reaction product. An amount of active catalyst within this range is not so large as to cause excessive decomposition of the alkylene oxide addition product of the main reaction, and excellent results have been obtained with an amount of sodium hydroxide which is about 0.03 to 0.10 percent by weight of the reactants. By active catalysts is meant the amount of catalyst present which has an alkalinity of the order of that of the alkali metal hydroxides, excluding such compounds of substantially lesser alkalinity as the carbonates and carboxylic acid salts which may be titratable as the hydroxide. Instead of the strongly alkaline hydroxides, the corresponding alcoholates may be used if desired. In general, the stronger the alkalinity of the catalyst, the less of it is required. All of the catalyst need not be added at the start of the reaction. If desired, a suitable amount may be added at the start, and the remainder of the catalyst added from time to time throughout the course of the reaction to maintain a substantially constant catalyst concentration.

The following examples serve to illustrate the method of the invention and are not to be considered as limiting.

EXAMPLES I TO V

Polyoxyethylene glycols having a molecular weight ranging from about 300 to 420 were prepared by the method of the invention. A total of twenty ethylene oxide feed points was employed in a reactor which consisted of 26⅝ inch O.D. tubes and 58 one-inch O.D. tubes, all eighteen feet long, which were connected by U-loops so that the tubes were in series. Table I below sets forth the conditions employed for preparing the polyoxyalkylene products and summarizes the data obtained when the products were analyzed. The sulfuric acid test color, obtained by heating 95 milliliters of the product with 5 milliliters of concentrated sulfuric acid at 100° C. for 30 minutes, was measured by comparison with platinum-cobalt color standards (APHA) and is so indicated in the table.

*Table I*

| Example | I | II | III | IV | V |
|---|---|---|---|---|---|
| Feed rate, lb./hour: | | | | | |
| Ethylene glycol | | 150 | | | |
| Diethylene glycol | 340 | | 323 | 323 | 323 |
| Ethylene oxide | 1,305 | 1,600 | 877 | 877 | 877 |
| Caustic soda, 50% solution | 2.8 | 1.05 | 2.2 | 0.7 | 2.2 |
| Tube temperature, °C | 135 | 140 | 120 | 120 | 120 |
| Pressure drop, p.s.i | 315 | 200 | 220 | 220 | 220 |
| Preheat temperature, °C | 65 | 55 | 80 | 40 | 80 |
| ANALYSIS | | | | | |
| Crude product: | | | | | |
| Color, APHA | 15 | 15 | 20 | 40 | 25 |
| Ethylene oxide, percent | 0.41 | 0.22 | 1.39 | 0.092 | 3.23 |
| Sodium hydroxide, percent | 0.06 | 0.03 | 0.078 | 0.088 | 0.056 |
| Refined product: | | | | | |
| Color, APHA | 10 | 15 | 20 | 35 | 10 |
| Sulfuric acid test color, APHA | 40 | 60 | 50 | 70 | 40 |
| Average molecular weight | 301 | 308 | 387 | 414 | 380 |
| Odor | None | None | None | None | None |
| Taste | Mild | Mild | Mild | Mild | Mild |

In Table II, below, the polyoxyalkylene products obtained by the continuous method described in Examples I to V were compared with those obtained by a conventional batch operation. As readily seen, the method of the invention provides a superior product as judged by color, taste, and odor. The sulfuric acid color test is the same as employed in Table I.

Table II

| Average Molecular Weight | 300 | | 400 | |
|---|---|---|---|---|
| Process | Continuous | Batch | Continuous | Batch |
| Color of unrefined product, APHA | 10–40 | 100–200 | 10–40 | 100–300 |
| Refined product Sulfuric acid test color, APHA | 40–60 | 40–100 | 40–70 | 60–200 |
| Taste | Mild | Bitter | Mild | Bitter |
| Odor | None | Mild | None | Mild |

What is claimed is:

1. A method for the continuous preparation of polyoxyalkylene compounds by reaction of a 1,2-alkylene oxide with a hydroxyl-containing compound selected from the group consisting of water and aliphatic mono-, di-, tri-, and polyhydric alcohols in an elongated coil-type reaction chamber having a length of at least about 4,000 feet, and immersed in a heat transfer medium, which method comprises continuously passing a mixture comprising said hydroxyl compound and an alkaline catalyst through said reaction chamber at a temperature between about 120 and 180° C., and contacting said mixture with a 1,2-alkylene oxide introduced at a plurality of intervals along said reaction chamber, the amount of said alkylene oxide and intervals for the introduction thereof being controlled and spaced so as to provide substantially the same concentration of unreacted alkylene oxide at each point of addition.

2. The method of claim 1 wherein the hydroxyl-containing compound is an aliphatic polyhydric alcohol; the alkylene oxide is ethylene oxide; and the amount of ethylene oxide introduced into the reaction chamber at each addition point ranges from about 1 to 7 percent, based on the weight of the reactants.

3. The method of claim 2 wherein the polyhydric alcohol is ethylene glycol and the catalyst is sodium hydroxide.

4. The method of claim 3 wherein the temperature is from about 120 to 140° C. and the pressure is from about 400 to 600 pounds per square inch gauge.

5. The method of claim 4 wherein the polyhydric alcohol is diethylene glycol and the amount of ethylene oxide introduced at each addition point is about 7 percent.

References Cited in the file of this patent
UNITED STATES PATENTS

| 1,987,007 | Frey | Jan. 8, 1935 |
| 2,159,746 | Maschwitz | May 23, 1939 |
| 2,400,437 | Perkins et al. | May 14, 1946 |
| 2,518,474 | Hudson | Aug. 15, 1950 |

FOREIGN PATENTS

| 736,991 | Great Britain | Sept. 21, 1955 |